US012497996B2

(12) United States Patent
Lamboglia et al.

(10) Patent No.: US 12,497,996 B2
(45) Date of Patent: Dec. 16, 2025

(54) WHEEL HUB ASSEMBLY HAVING LOW FRICTION AND HIGH PERFORMANCE

(71) Applicant: AKTIEBOLAGET SKF, Gothenburg (SE)

(72) Inventors: Francesco Lamboglia, Pinerolo (IT); Marco Gemello, Nichelino (IT); Steffen Krines, Mellrichstadt (DE)

(73) Assignee: AKTIEBOLAGET SKF (SE)

( * ) Notice: Subject to any disclaimer, the term of this patent is extended or adjusted under 35 U.S.C. 154(b) by 610 days.

(21) Appl. No.: 17/688,377

(22) Filed: Mar. 7, 2022

(65) Prior Publication Data

US 2022/0290717 A1    Sep. 15, 2022

(30) Foreign Application Priority Data

Mar. 12, 2021    (IT) .................. 102021000005837

(51) Int. Cl.
*F16C 19/18*    (2006.01)
*B60B 27/00*    (2006.01)
(Continued)

(52) U.S. Cl.
CPC ........ *F16C 19/183* (2013.01); *B60B 27/0005* (2013.01); *B60B 27/0094* (2013.01); *B60B 27/02* (2013.01); *F16C 33/58* (2013.01); *B60B 2380/12* (2013.01); *B60B 2380/75* (2013.01); *F16C 2326/02* (2013.01)

(58) Field of Classification Search
CPC .... F16C 19/183; F16C 19/186; F16C 19/505; F16C 33/585; B60B 27/0005; B60B 27/0094

See application file for complete search history.

(56) References Cited

U.S. PATENT DOCUMENTS

2005/0111771 A1\*  5/2005  Shevket ................ F16C 19/497
                                                    384/494
2009/0010583 A1\*  1/2009  Mock .................... F16C 19/184
                                                    384/455
(Continued)

FOREIGN PATENT DOCUMENTS

EP    2380749         10/2011
JP    4225006    †    2/2009
JP    4225006 B2 \*   2/2009    ............ F16C 19/186

OTHER PUBLICATIONS

Search Report for corresponding Italian Patent Application No. 102021000005837 dated Nov. 8, 2021.

*Primary Examiner* — John Olszewski
*Assistant Examiner* — Aimee Tran Nguyen
(74) *Attorney, Agent, or Firm* — Reed Smith LLP

(57) ABSTRACT

A bearing unit for a wheel hub assembly for motor vehicles, the bearing unit having an axis of rotation (X) and having two radially outer raceways, two radially inner raceways, two rows of rolling bodies, the bearing unit having tribological parameters whose values affect the magnitude of the frictional forces between the respective raceways and rolling bodies of the rows of rolling bodies, wherein at least one value of a tribological parameter is minimized or maximized to reduce the magnitude of the frictional forces as a function of the relative position along the axis (X) of a line of action (W) of loads acting on the bearing unit and of the plane of axial symmetry (Z).

2 Claims, 3 Drawing Sheets

(51) Int. Cl.
*B60B 27/02* (2006.01)
*F16C 33/58* (2006.01)

(56) References Cited

U.S. PATENT DOCUMENTS

2009/0010586 A1 † 1/2009 Mock
2010/0046870 A1    2/2010 Shibuya
2011/0254352 A1 † 10/2011 Ciulla
2015/0211578 A1 † 7/2015 Wensing

* cited by examiner
† cited by third party

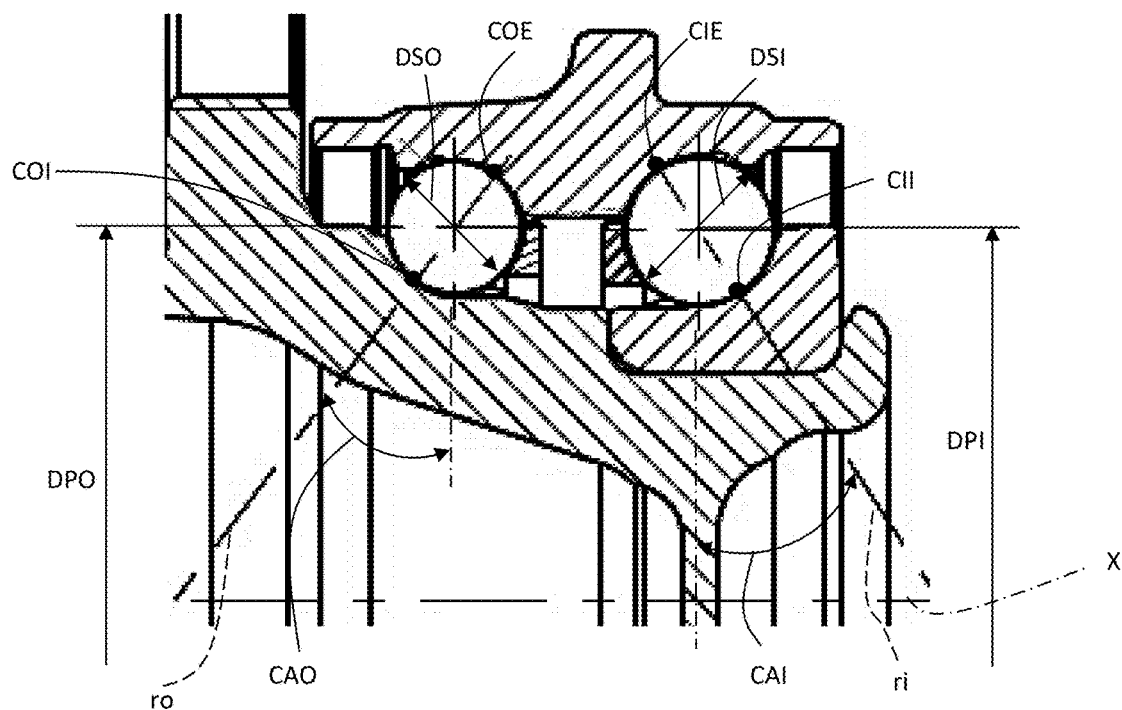
Fig. 3 – Det. Y
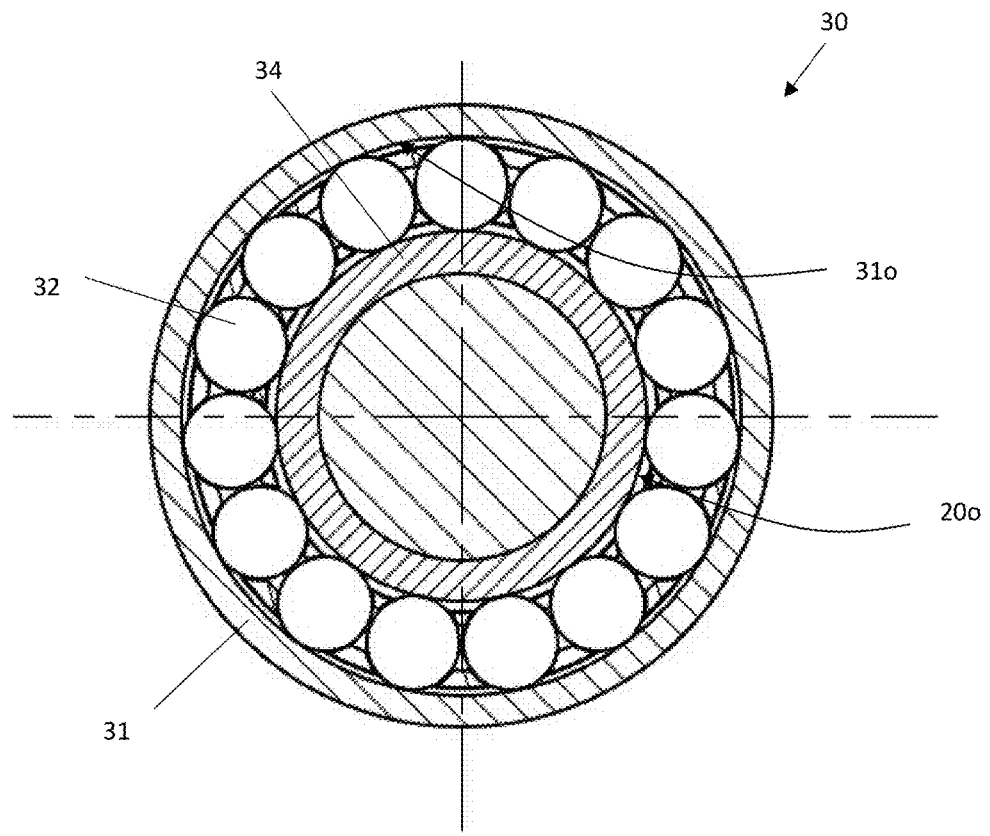
Fig. 4

WHEEL HUB ASSEMBLY HAVING LOW FRICTION AND HIGH PERFORMANCE

CROSS-REFERENCE OF RELATED APPLICATIONS

This application is based on and claims priority to Italian Patent Application No. 102021000005837 filed on Mar. 12, 2021, under 35 U.S.C. § 119, the disclosure of which is incorporated by reference herein.

FIELD

The present disclosure relates to a wheel hub assembly provided with a bearing unit which in turn includes a pair of rolling bearings for rotatably supporting a vehicle wheel on a suspension.

BACKGROUND

A wheel hub assembly provided with a bearing unit for rotatably supporting a wheel of a vehicle on a suspension system is known and commonly used. The bearing unit, in general, includes a pair of rolling bearings, but different configurations of the bearing unit to which the present disclosure may be applied are also known. In some configurations, the outer ring of the bearing unit is rotatable while the inner rings of the bearing unit are fixed, but also the opposite case in which the inner rings rotate and the outer ring is fixed.

BRIEF DESCRIPTION OF THE DRAWINGS

The attached drawings illustrate various non-limiting exemplary embodiments in accordance with this disclosure, in which:

FIG. 3 is a detail view on an enlarged scale of various embodiments of the bearing unit of FIG. 1 in accordance with this disclosure, and FIG. 4 is a frontal sectional view of various embodiments of the bearing unit of FIG. 1 in accordance with this disclosure.

DETAILED DESCRIPTION

Figure 1:
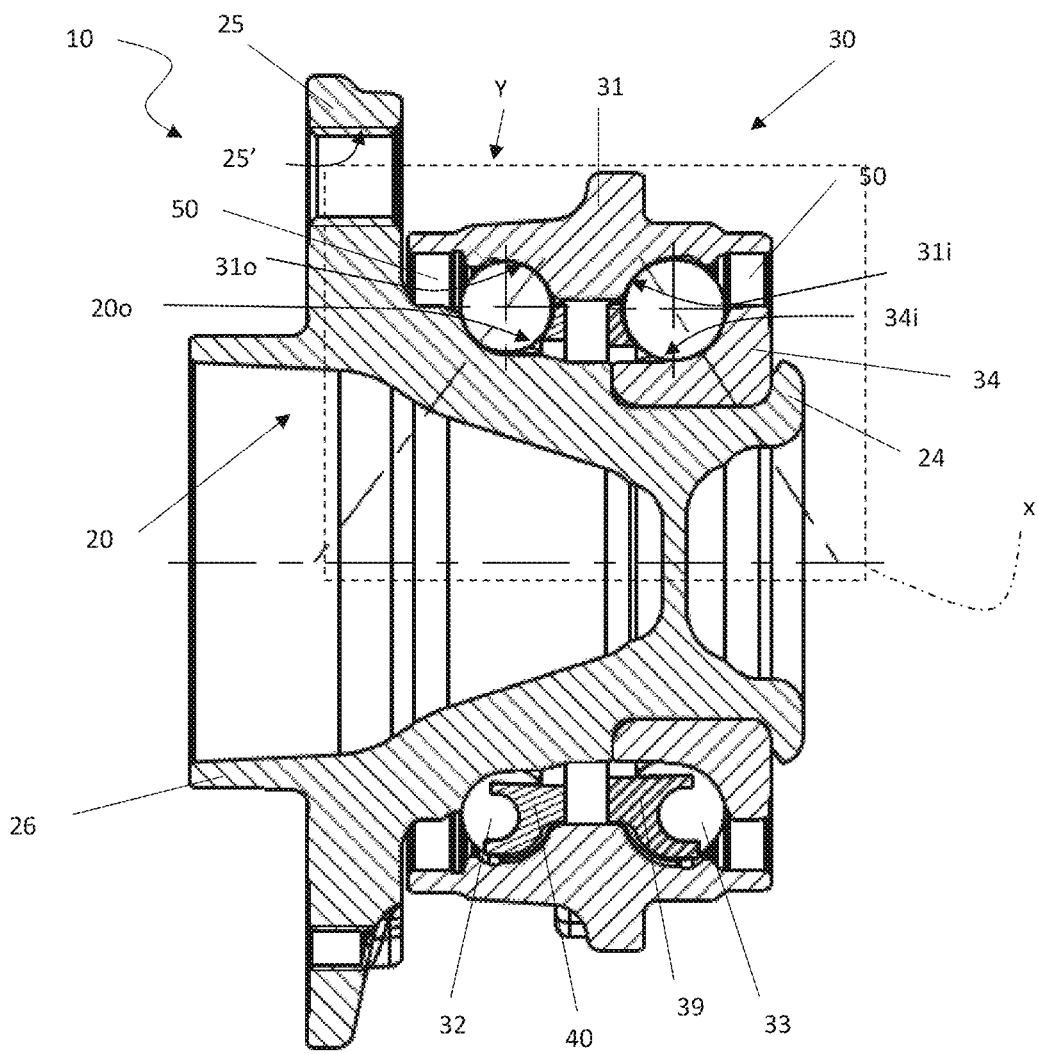
FIG. 1 is a cross-sectional view of various embodiments of a wheel hub assembly having a bearing unit in accordance with this disclosure.

In various examples, the wheel hub assembly includes a rotatable hub provided with a flange for attachment to a rotating element of the motor vehicle, for example the wheel or the disc of a braking element, while the bearing unit includes an outer ring, a pair of inner rings, one of which may be the hub itself, and a plurality of rolling bodies, for example balls. These components typically have axial symmetry with respect to an axis of rotation of the rotating elements, for example a wheel hub and inner rings of an exemplary bearing unit.

Because of the increase in global competition, among other factors, automotive manufacturers, for example, are constantly demanding ongoing technical and economical improvements in wheel hub assemblies. In particular, there is a constant demand for a reduction in the friction losses of the whole assembly for given applications, that is to say for given applied loads and available dimensions. For example, the bearing unit of a wheel hub assembly may be required to support an axle load of up to 1,700 kg, and to pass the corresponding endurance tests, while still keeping the friction of the bearing unit at not more 0.5 Nm if a single sealing device is present, or at not more than 0.75 Nm if there are two sealing devices. One example for reducing friction losses is that of optimizing the sealing devices of the bearing unit, for example by reducing the number of contact lips and/or by fitting labyrinth seals. However, the aforementioned values of friction cannot be achieved by optimizing the sealing means, since it is only possible to achieve values of about 1-1.5 Nm, practically twice the desired level.

In addition to the sealing devices, it is possible to adjust the tribological parameters of the bearing unit: the osculation, in other words the ratio between the radii of curvature of the raceways and the diameters of the balls, the contact angle (the angle that the straight line joining the centers of pressure between the raceways and the balls with the radial direction of the bearing unit), the number and diameter of the balls in the row, and other parameters all affect the magnitude of the friction forces exchanged between the balls and the raceways.

However, the optimization of these parameters is not a simple matter, since the aforesaid parameters are usually based on trade-offs between low frictional resistance and high load capacity and high rigidity. In other words, optimization in respect of frictional resistance entails a penalty for the load capacity of the bearing and consequently for its service life.

We have identified a need for an original design solution for the bearing unit of a wheel hub assembly which is free of the aforementioned drawbacks, or which at least mitigates them to a remarkable degree.

In order to overcome the technical problems identified above to a substantial extent, embodiments of the present disclosure provide a bearing unit for a wheel hub assembly that is designed, on the basis of the parameters of the loading on the rows of rolling bodies, in such a way as to optimize the tribological parameters and thereby reduce the frictional forces. Embodiments of the present disclosure define appropriate criteria for maximizing or minimizing said parameters, depending on whether the more loaded row of rolling bodies is the axially outer row or the axially inner row.

In particular, the embodiments of the disclosure provide the strategic choice of adopting the value of an offset (RTO), which is the distance between the line of action of the loads transmitted by the wheel to the bearing unit and the plane of axial symmetry of the bearing unit, as the parameter that guides the optimization process.

Depending on the value of the distance RTO, the optimization includes modifying the values of the tribological parameters of the less loaded row of rolling bodies, by maximizing or minimizing it, and leaving unchanged the values of the tribological parameters of the more loaded row of rolling bodies.

In other words, the relative position of a line of action of the loads acting on the bearing unit and of the plane of axial symmetry (Z) along the axis of rotation of the bearing unit may be used for an innovative approach to the optimization of the tribological parameters of the bearing unit. This approach allows a rapid calculation of the bearing characteristics and leads to a fast and efficient convergence of the tribological parameters by avoiding the use of numerous iterations and successive compromises, which would not only fail to provide satisfactory results in terms of friction reduction, but would in many cases entail the sacrifice of some characteristics in favor of others without enabling the potential of the materials and the geometry of the bearing unit to be fully exploited.

For given conditions of application and overall geometrical dimensions, this bearing unit yields a reduction of about 30% in the friction losses under load and an increase of about 50% in the fatigue life and rigidity of the raceways.

Therefore, according to the present disclosure, a bearing unit for a wheel hub assembly is provided, with the characteristics stated in the independent claim appended to the present description.

Further exemplary embodiments are described according to the characteristics stated in the appended dependent claims.

According to another aspect of the present disclosure, a wheel hub assembly having the bearing unit as defined by the claims appended to the present description is provided.

The present disclosure relates to a bearing unit designed so that the wheel hub assembly can operate with low friction losses and high performance.

By way of non-limiting example, the present disclosure will now be described with reference to a wheel hub assembly for motor vehicles provided with a bearing unit.

With reference to FIG. 1, a wheel hub assembly according to exemplary embodiments of the disclosure is indicated as a whole by 10. The figure shows a detail of an example of configuration.

The wheel hub assembly 10 has a central axis of rotation X and includes a hub 20, which is preferably but not necessarily rotatable, represented for simplicity in FIG. 1 as a single element, but according to the present disclosure comprising at least two separate elements that are fixed together, as described more fully below. The wheel hub assembly 10 also includes a bearing unit 30, which in turn includes a radially outer ring 31 which is preferably but not necessarily fixed, a radially inner ring 20 which is preferably but not necessarily rotatable, defined by the hub 20, a further radially inner ring 34, which is preferably but not necessarily rotatable, mounted on, and fixed to, the hub 20, two rows of rolling bodies 32, 33, in this example balls, interposed between the radially outer ring 31 and the radially inner rings 20 and 34; and two containment cages 39 and 40 for keeping the rolling bodies of the rows of rolling bodies 32, 33 in position.

Throughout the present description and the claims, terms and expressions indicating positions and orientations such as "radial" and "axial" are to be interpreted as relative to the central axis of rotation X of the bearing unit 30. On the other hand, expressions such as "axially outer" and "axially inner" relate to the assembled condition of the wheel hub assembly, and in the present case relate to a wheel side and to a side opposite the wheel side, respectively.

The radially outer ring 31 is provided with two radially outer raceways, which are, respectively, a first axially outer raceway 31o and a second axially inner raceway 31i. The radially inner rings 20, 34 are provided with radially inner raceways, which are, respectively, a first axially outer raceway 20o and a second axially inner raceway 34i. The raceways allow the rolling of the axially outer row of rolling bodies 32 interposed between the radially outer ring 31 and the hub 20, and the axially inner row of rolling bodies 33 between the radially outer ring 31 and the radially inner ring 34. For simplicity of graphic representation, the references 32, 33 will be applied both to the individual balls and to the rows of balls. Also for simplicity, the term "ball" may be used by way of example in the present description and in the attached drawings in place of the more generic term "rolling body" (and the same reference numerals will also be used).

The wheel hub 20 defines, at its axially inner end, a rolled edge 24 which is configured for axially pre-loading the inner ring 34. The wheel hub 20 also has an axially outer flange portion 25. The flange portion has a plurality of axial fixing holes 25'. These holes are the seats for the same number of fixing means (such as captive bolts, not shown in the figure) which connect, in a known way, an element of the wheel of the motor vehicle, for example the non-driving wheel or the disc of the brake (also of a known type, and not shown in the figure) to the wheel hub 20. In accordance with embodiments of the disclosure, the hub 20 has an axially outer cylindrical portion 26 that acts as a centering means for the element of the wheel of the motor vehicle.

The wheel hub assembly unit 10 may also be provided with sealing devices 50 for sealing the bearing unit from the external environment.

Figure 2:
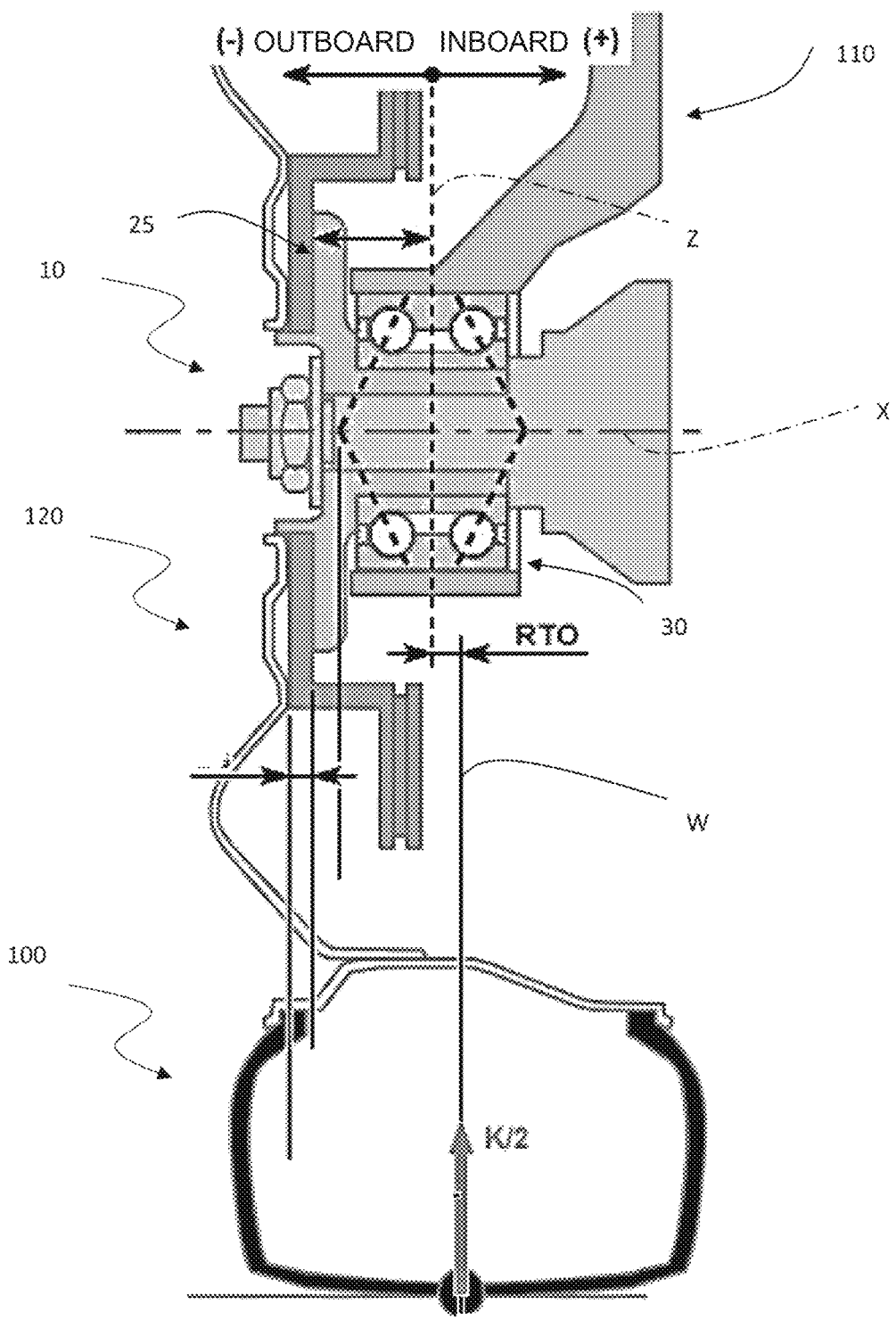
FIG. 2 is a schematic representation of various embodiments of the wheel hub assembly of FIG. 1, which rotatably supports a vehicle wheel on a suspension of the vehicle in accordance with this disclosure.

FIG. 2 is a schematic representation of an example embodiment of the mounting of the wheel hub assembly 10, which rotatably supports a vehicle wheel 100 by means of a suspension 110 of the vehicle. By means of the flange portion 25 described above, the wheel hub assembly 10 is attached to the disc 120 of a brake element, which is in turn rotatably fastened to the wheel 100.

FIG. 2 shows the geometric parameter RTO (abbreviation of "Reference Tyre Offset"), which represents the distance (or offset) between the line of action W of the loads K/2 transmitted by the wheel 100 to the bearing unit 30 and the axial plane of symmetry Z of said bearing unit 30.

The value of the offset RTO is positive if the line of the loads W is axially inside the plane Z (inboard) and is negative in the opposite case in which the line of the loads W is axially outside the plane Z (outboard). Depending on whether the offset RTO is axially outside or axially inside, and applying the principle of the lever, either the axially outer row of rolling bodies 32 or the axially inner row of rolling bodies 33, respectively, will be more loaded.

The insight on which the present disclosure is based is that of making the optimization of the tribological parameters of the bearing unit 30 dependent on the sign (positive or negative) of the offset RTO, and, on its value. In fact, given that the aforesaid parameters are a trade-off between low frictional resistance and high load capacity, the optimization consists in modifying the values of the tribological parameters of the less loaded row of rolling bodies, while leaving unchanged the values of the tribological parameters of the more loaded row of rolling bodies.

Thus the more loaded row of rolling bodies will not be penalized in terms of load resistance, and consequently in terms of service life, while the less loaded row of rolling bodies will be optimized so as to reduce the frictional resistance as far as possible, to the detriment of the load capacity, although, since this capacity exceeds that which is required by the effective load acting on it, this will not result in any practical disadvantage.

The tribological parameters to be considered are:
1) the pitch diameter. This is the diameter of the centers of the rolling bodies (referred to below as "balls"), on the assumption of an equal clearance with both the radially inner and the radially outer raceway. The detail in FIG. 3 shows the axially outer pitch diameter DPO and the axially inner pitch diameter DPI. The values of these diameters may differ from each other;
2) the number and outside diameter of the balls. For a given pitch diameter, these two parameters will be in a reciprocal relationship: as the number of balls increases, their diameter decreases, and vice versa. The detail in FIG. 3 shows the outside diameter DSO of the balls of the axially outer row of balls 32 and the outside diameter DSI of the balls of the axially inner row of balls 33. The values of these diameters may also differ from each other. The reference NSO is used below for the number of balls in the axially outer row of balls 32, and NSI is used to indicate the number of balls in the axially inner row of balls 33;

3) the osculations. "Osculation" is taken to mean the ratio between the radius of curvature of the raceway and the outside diameter of the balls. In particular, the following are indicated below:
  a. OOE: the ratio of the radius of curvature of the radially outer and axially outer raceway 31o to the outside diameter DSO of the balls in the axially outer row of balls 32;
  b. OIE: the ratio of the radius of curvature of the radially outer and axially inner raceway 31i to the outside diameter DSI of the balls in the axially inner row of balls 33;
  c. OOI: the ratio of the radius of curvature of the radially inner and axially outer raceway 20o to the outside diameter DSO of the balls in the axially outer row of balls 32;
  d. OII: the ratio of the radius of curvature of the radially inner and axially inner raceway 34i to the outside diameter DSI of the balls in the axially inner row of balls 33;

4) the contact angle. This is the angle that the straight line ro, ri joining the centers of pressure between the raceways and the balls forms with the radial direction of the bearing unit. The detail in FIG. 3 shows the contact angle CAO of the balls in the axially outer row of balls 32 and the contact angle CAI of the balls in the axially inner row of balls 33. The values of these angles may also differ from each other. The contact points between the balls and the raceways are also indicated, respectively, as follows:
  a. COE: the contact point between the radially outer and axially outer raceway 31o and the ball in the axially outer row of balls 32;
  b. CIE: the contact point between the radially outer and axially inner raceway 31i and the ball in the axially outer row of balls 33;
  c. COI: the contact point between the radially inner and axially outer raceway 20o and the ball in the axially outer row of balls 32;
  d. CII: the contact point between the radially inner and axially inner raceway 34i and the ball in the axially outer row of balls 33.

The frictional resistances in the bearing unit 30 are thus reduced by two different strategies depending on whether the offset RTO is negative or positive.

1) The first case is present when RTO<0, that is to say when the axially outer row of balls 32 is more loaded than the axially inner row of balls 33. The axially outer row of balls 32 and the corresponding raceways 31o and 20o keep the values of their tribological parameters unchanged, whereas these values are optimized for the axially inner row of balls 33 and the corresponding raceways 31i and 34i, in this way and in this order:
  a. The pitch diameter DPI, relating to the axially inner row of balls 33, is to be minimized, while bearing in mind the constraints of the specific application, since the extreme values are limited by the overall outside and inside dimensions of the wheel hub assembly 10, which in turn are dependent on the specific application. Values for the pitch diameter DPI tend towards a minimum value of 35 mm, below which it would be impossible to ensure the load capacity and rigidity required by the application. A value in exemplary embodiments is 70.7 mm, which is linked to the outside diameter DSI of the balls in the axially inner row of balls 33 by the following relation:

$$DPI = 4.948 \times DSI$$

This is the optimal value derived from calculations and experimental tests carried out for a specific application.
  b. Additionally, where the axially inner row of balls 33 is concerned, the number of balls NSI should be kept as small as possible; that is to say, the outside diameter DSI of the balls should be as large as possible. A smaller number of balls—resulting in a smaller number of contact areas between the balls and the raceways—provides less overall friction. The minimum number of balls Min (NSI) to be aimed for depends on the pitch diameter DPI selected. On the basis of the value of the pitch diameter, the maximum permissible number of balls Max (NSI) is first be calculated, as follows:

$$\operatorname{Min}(NSI) = \text{nearest integer to } \pi/\arcsin((DSI+0.1)/DPI)$$

This formula gives us the maximum number of balls calculated subject to the condition that the balls are spaced apart by 0.1 mm on the pitch diameter in a frontal cross section such as that shown in FIG. 4. A greater value of Max (NSI) would create a problem of undesired contact between the balls, since a spacing of less than 0.1 mm would not be enough to prevent the rolling bodies from touching each other, thus generating noise and running the risk of undesired damage. Starting with the value of Max (NSI), the value of the minimum number of balls Min (NSI) is found by reducing this value by eight units. In other words:

$$\operatorname{Min}(NSI) = \text{nearest integer to } \pi/\arcsin((DSI+0.1)/DPI) - 8$$

The value 8 is the limit that does not adversely affect load capacity or create problems of noise, vibration and false brinelling, but enables remarkable friction reduction to be achieved. A value in exemplary embodiments is NSI=15, which is derived from calculations and experimental tests carried out for a specific application.

Therefore, when the pitch diameter DPI and the number of balls NSI in the axially inner row of balls 33 have been established, a range is derived for the diameter of the balls DSI, which will be from 8 mm to 21 mm, with a value of 14.288 mm in exemplary embodiments.
  c. The osculations, in this case the values of OIE and OII, relating to the axially inner row of balls 33 are maximized as far as possible. Thus the curvature of the raceway increases and the raceway circumscribes the respective ball to a lesser degree, and therefore the contact area between the ball and the raceway decreases, resulting in a decrease in friction. The assumptions to be made are as follows: in the first place, both osculations OIE and OII are greater than 0.505. If this were not the case, given the manufacturing tolerances, elements with an osculation of 0.5 or even less might be produced, so that the theoretical contact between the ball and the raceway could be linear rather than a point contact (with an osculation of 0.5), or there could be contact at more than one point (with an osculation of less than 0.5). Starting from this assumption, the values of the osculations OIE and OII are to be maximized and should tend, respectively, towards 0.585 for the osculation OIE and 0.575 for the osculation OII. These values represent the limit values that do not adversely affect the load capacity or create problems of noise, vibration and false brinelling, but enables remarkable friction reduction to be achieved. Values in exemplary embodiments are an OIE equal to 0.5375 and an OII equal to 0.5179, these values being derived from calculations and experimental tests carried out for a specific application.

It will be appreciated upon a full reading of this disclosure that the values chosen for the ratios OIE (which, it will be recalled, is the ratio of the radius of curvature of the radially outer and axially inner raceway 31$i$ to the outside diameter DSI of the balls in the axially inner row of balls 33) and OII (the ratio of the radius of curvature of the radially inner and axially inner raceway 34$i$ to the outside diameter DSI of the balls in the axially inner row of balls 33) are such that OIE>OII. Similarly, the relation OOE>OOI must be satisfied in respect of the osculations of the axially outer raceways. This because, as explained below, the radially outer raceways (both the axially inner and the axially outer raceways) have greater values of osculation than the radially inner raceways.

d. The contact angle CAI for the axially inner row of balls 33 is minimized, in other words made as small as possible, so that the straight line of the contact points CIE and CII tends to follow a direction that is as nearly radial as possible, and that is therefore capable of opposing the radial load (substantially the weight of the vehicle) in an optimal way, in conditions of movement along a straight-line trajectory, which generates friction in the row of balls. When this is done, the tangential component of the loads acting on the contact areas between a ball and a raceway tends to decrease, or even disappear, as a result of which the friction also decreases. Starting from a maximum value of CAI equal to 50°, the value of CAI is minimized until it tends towards a limit value of a 10°. This value does not adversely affect the load capacity or create problems of noise, vibration and false brinelling, but enables remarkable friction reduction to be achieved. A value in exemplary embodiments is derived when CAI is 33°, a value derived from calculations and experimental tests carried out for a specific application.

Because of what has been stated above, in the case of RTO<0, in other words when the axially outer row of balls 32 is more loaded than the axially inner row of balls 33, it will be appreciated upon a full reading of this disclosure that, when the pitch diameters of the two rows of balls are equal (DPI=DPO), the value of NSO is greater than the value of NSI; in other words, the axially inner row of balls 33 will always have a smaller number of balls than the number present in the axially outer row of balls 32. Therefore, the diameter DSI of the balls in the axially inner row of balls 33 will always be greater than the diameter DSO of the balls in the axially outer row of balls 32.

For the osculations, the following relations are also satisfied:

$$OIE > OOE \text{ and } OII > OOI$$

These relations are due to the fact that larger osculations may be provided in the axially inner raceways 31$i$ and 34$i$, which are less loaded than the axially outer raceways 31$o$ and 20$o$. While the relations OIE>OOE and OII>OOI, and the other two relations described above (OIE>OII and OOE>OOI), are satisfied, the values of the four osculations may all be different from each other. In other words, each raceway may have a value of osculation that differs from those of the other raceways.

Finally, the value of the contact angle CAI of the balls in the axially inner row of balls 33 will always be smaller than the value of the contact angle CAO of the balls in the axially outer row of balls 32.

2) The second case is present when RTO>0, that is to say when the axially inner row of balls 33 is more loaded than the axially outer row of balls 32. The axially inner row of balls 33 and the corresponding raceways 31$i$ and 34$i$ keep the values of their tribological parameters unchanged, whereas these values are optimized for the axially outer row of balls 32 and the corresponding raceways 31$o$ and 20$o$, in this way and in this order:

a. The pitch diameter DPO, at the axially outer row of balls 32, is to be minimized in this case too, while bearing in mind the constraints of the specific application: in fact, the extreme values are limited by the overall outside and inside dimensions of the wheel hub assembly 10, which in turn are dependent on the specific application. Values for the pitch diameter DPO tend towards a minimum value of 35 mm, below which it would be impossible to ensure the load capacity and rigidity required by the application.

A value in exemplary embodiments is 71.3 mm, which is linked to the outside diameter DSO of the balls in the axially outer row of balls 32 by the following relation:

$$DPO = 5.614 \times DSO$$

This is the optimal value derived from calculations and experimental tests carried out for a specific application.

b. Additionally, where the axially outer row of balls 32 is concerned, the number of balls NSO should be kept as small as possible; that is to say, the outside diameter DSO of the balls should be as large as possible. A smaller number of balls—resulting in a smaller number of contact areas between the balls and the raceways—provides less overall friction. The minimum number of balls Min (NSO) to be aimed for depends on the pitch diameter DPO selected. On the basis of the value of the pitch diameter, the maximum permissible number of balls Max (NSO) is first calculated, as follows:

$$\text{Max}(NSO) = \text{nearest integer to } \pi/\arcsin((DSO+0.1)/DPO)$$

In this case also, the formula gives us the maximum number of balls calculated subject to the condition that the balls are spaced apart by 0.1 mm on the pitch diameter in a frontal cross section such as that shown in FIG. 4. A greater value of Max (NSO) would create a problem of undesired contact between the balls, since a spacing of less than 0.1 mm would not be enough to prevent the rolling bodies from touching each other, thus generating noise and running the risk of undesired damage. Starting with the value of Max (NSO), the value of the minimum number of balls Min (NSO) is found by reducing this value by eight units. In other words:

$$\text{Min}(NSO) = \text{nearest integer to } \pi/\arcsin((DSO+0.1)/DPO) - 8$$

The value 8 is the limit that does not adversely affect load capacity or create problems of noise, vibration and false brinelling, but enables remarkable friction reduction to be achieved. A value in exemplary embodiments is NSO=17, which is derived from calculations and experimental tests carried out for a specific application.

Therefore, when the pitch diameter DPO and the number of balls NSO in the axially outer row of balls 32 have been established, a range is derived for the diameter of the balls DSO, which will be from 7 mm to 20 mm, with a value in exemplary embodiments of 12.7 mm.

c. The osculations, in this case the values of OOE and OOI, relating to the axially outer row of balls 32 is maximized as far as possible. Thus the curvature of the raceway increases and the raceway circumscribes the respective ball to a lesser degree, and therefore the contact area between the ball and the raceway decreases, resulting in a decrease in friction.

The assumptions to be made are as follows: in the first place, both osculations OOE and OOI are greater than 0.505. If this were not the case, given the manufacturing tolerances, elements with an osculation of 0.5 or even less might be produced, so that the theoretical contact between the ball and the raceway could be linear rather than a point contact (with an osculation of 0.5), or there could be contact at more than one point (with an osculation of less than 0.5). Starting from this assumption, the values of the osculations OOE and OOI should be maximized and should tend, respectively, towards 0.585 for the osculation OOE and 0.575 for the osculation OOI. These values represent the limit values that do not adversely affect the load capacity or create problems of noise, vibration and false brinelling, but enables remarkable friction reduction to be achieved. Values in exemplary embodiments are an OOE equal to 0.5362 and an OOI equal to 0.5173, these values being derived from calculations and experimental tests carried out for a specific application.

It will be appreciated upon a full reading of this disclosure that the values chosen for the ratios OOE (which, it will be recalled, is the ratio of the radius of curvature of the radially outer and axially outer raceway 31o to the outside diameter DSO of the balls in the axially outer row of balls 32) and OOI (the ratio of the radius of curvature of the radially inner and axially outer raceway 20o to the outside diameter DSO of the balls in the axially outer row of balls 32) are such that OOE>OOI. Similarly, the relation OIE>OII is satisfied in respect of the osculations of the axially inner raceways. This because the radially outer raceways (both the axially inner and the axially outer raceways) have greater values of osculation than the radially inner raceways.

The explanation of what has been stated above is as follows, with additional reference to FIG. 4: The raceways are represented as a curved surface with a variable curvature in space. In a transverse cross section such as that of FIG. 1 or 3, the surfaces of the raceway have a concavity that tends to "circumscribe" the convex surface of the ball. This is true of both the radially outer and the radially inner raceways. However, along a frontal cross section, such as that of FIG. 4, orthogonal to the transverse cross section, it is observed that the radially outer raceway 31o has a concavity that tends to "circumscribe" the convex surface of the ball 32. The case of two internally tangent circumferences should be considered. Conversely, the radially inner raceway 20o takes the form of a convex surface that faces another convex surface, namely that of the ball 32. In this case, the analogy of two externally tangent circumferences should be considered. In this situation, therefore, the raceway 20o does not "circumscribe" the ball 32, and consequently the contact area between raceway and ball has smaller dimensions than those of the similar area formed by the radially outer raceway.

Consequently, the radially outer raceway, which, other things being equal, has a larger contact surface with the ball and therefore lower contact pressures, can accept greater osculations. In other words, it can accept, more readily than the inner raceway, a reduction in the contact surface with the ball, since it starts from a more favourable situation.

d. The contact angle CAO for the axially outer row of balls 32 is made as small as possible, so that the straight line of the contact points COE and COI tends to follow a direction that is as nearly radial as possible, and that is therefore capable of opposing the radial load (substantially the weight of the vehicle) in an optimal way, in conditions of movement along a straight-line trajectory, which generates friction in the row of balls. When this is done, the tangential component of the loads acting on the contact areas between a ball and a raceway tends to decrease, or even disappear, as a result of which the friction also decreases. Starting from a maximum value of CAO equal to 50°, the value of CAO is minimized until it tends towards a limit value of a 10°. This value does not adversely affect the load capacity or create problems of noise, vibration and false brinelling, but enables remarkable friction reduction to be achieved. A value in exemplary embodiments is derived when CAO is 37°, a value derived from calculations and experimental tests carried out for a specific application.

Because of what has been stated above, in the case of RTO>0, in other words when the axially inner row of balls 33 is more loaded than the axially outer row of balls 32, it will be appreciated upon a full reading of this disclosure that, when the pitch diameters of the two rows of balls are equal (DPI=DPO), the value of NSI is greater than the value of NSO; in other words, the axially outer row of balls 32 will have a smaller number of balls than the number present in the axially outer row of balls 33. Therefore, the diameter DSO of the balls in the axially outer row of balls 32 will always be greater than the diameter DSI of the balls in the axially inner row of balls 32.

For the osculations, the following relations are also satisfied:

$$OOE>OIE \text{ and } OOI>OII$$

These relations are due to the fact that larger osculations may be provided in the axially inner raceways 31o and 24o, which are less loaded than the axially outer raceways 31i and 34i. While the relations OOE>OIE and OOI>OII, and the other two relations described above (OIE>OII and OOE>OOI), are satisfied, the values of the four osculations may all be different from each other. In other words, each raceway may have a value of osculation that differs from those of the other raceways.

Finally, the value of the contact angle CAO of the balls in the axially outer row of balls 32 will always be smaller than the value of the contact angle CAI of the balls in the axially inner row of balls 33.

To sum up, for given conditions of application and overall geometrical dimensions, this bearing unit yields a reduction of about 30% in friction losses under load, an effect that is achieved solely by adjusting the contact between the rolling bodies and the raceways without any action on the sealing devices, and an increase of about 50% in the fatigue life and rigidity of the raceways, as well as a reduction of 5 μm in false brinelling.

The reduction of the friction losses provides a considerable advantage in terms of cost reduction for vehicle manufacturers, since the vehicle may exhibit a remarkable reduction in carbon dioxide emission and/or a smaller number of batteries to equip the vehicle for a given mileage.

In addition to the embodiment of the disclosure as described above, it is to be understood that there are numerous other variants. It is also to be understood that these embodiments are provided solely by way of example and do not limit the object of the disclosure or its applications or its possible configurations. On the contrary, although the description given above enables a person skilled in the art to implement the present disclosure according to at least one example of its embodiment, it is to be understood that numerous variations of the components described are possible without departure from the object of the disclosure as defined in the appended claims, which are interpreted literally and/or according to their legal equivalents.

The invention claimed is:

1. A wheel hub assembly for motor vehicles comprising:
a wheel hub configured to support a vehicle wheel and comprising an axially outer vehicle wheel side and an axially inner vehicle wheel side opposite the axially outer vehicle wheel side; and
a bearing unit, the bearing unit having a rotation axis (X) and comprising:
two radially outer raceways comprising a first raceway and a second raceway, wherein the first raceway is a radially outer and axially outer raceway, and wherein the second raceway is a radially outer and axially inner raceway,
two radially inner raceways comprising a third raceway and a fourth raceway, wherein the third raceway is a radially inner and axially outer raceway, and wherein the fourth raceway is a radially inner and axially inner raceway,
two rows of rolling bodies comprising axially outer rolling bodies and axially inner rolling bodies, interposed, respectively, between the first raceway and the third raceway and between the second raceway and the fourth raceway and centers of each of the two rows of rolling bodies are in axially symmetrical positions relative to a plane of axial symmetry (Z) of the bearing unit,
wherein the bearing unit comprises tribological parameters, the tribological parameters comprising:
pitch diameters comprising an axially inner pitch diameter (DPI) relating to the axially inner row of rolling bodies and an axially outer pitch diameter (DPO) relating to the axially outer row of rolling bodies;
a number (NSI) of rolling bodies of the axially inner row of rolling bodies and a number (NSO) of rolling bodies of the axially outer row of rolling bodies;
an external diameter (DSI) of the rolling bodies of the axially inner row of rolling bodies and an external diameter (DSO) of the rolling bodies of the axially outer row of rolling bodies;
osculations (OIE, OII, OOE, OOI) of the bearing unit comprising:
a first osculation (OIE) comprising a ratio of a radius of curvature of the radially outer and axially inner raceway and the external diameter (DSI) of the rolling bodies of the axially inner row of rolling bodies,
a second osculation (OIL) comprising a ratio of a radius of curvature of the radially inner and axially inner raceway and the external diameter (DSI) of the rolling bodies of the axially inner row of rolling bodies,
a third osculation (OOE) comprising a ratio of a radius of curvature of the radially outer and axially outer raceway and the external diameter (DSO) of the rolling bodies of the axially outer row of rolling bodies, and
a fourth osculation (OOI) comprising a ratio of a radius of curvature of the radially inner and axially outer raceway and the external diameter (DSO) of the raceways of the axially outer row of rolling bodies; and
a contact angle (CAI) of the rolling bodies of the axially inner row of rolling bodies and contact angle (CAO) of the rolling bodies of the axially outer row of rolling bodies,
wherein a line of action (W) of loads configured to act on the bearing unit when the wheel hub is mounted on the vehicle and the plane of axial symmetry (Z) define between each other, and along the axis (X), a distance (RTO), wherein the distance (RTO) is positive when the line of action (W) is axially inside the plane of axial symmetry (Z) and the distance (RTO) is negative when the line of action (W) is axially outside the plane of axial symmetry (Z);
wherein, when the distance (RTO) is a positive value, the tribological parameters of the axially outer row of rolling bodies comprise:
the axially outer pitch diameter (DPO) comprises a value no less than 35 mm,
the number (NSO) of rolling bodies of the axially outer row of rolling bodies is (NSO)=nearest integer to π/arcsin ((DSO+0.1)/DPO)−8,
the external diameter (DSO) of the rolling bodies of the axially outer row of rolling bodies comprises a value between 7 mm<DSO<20 mm,
the third osculation (OOE) comprises a value between 0.505<OOE<0.585, and the fourth osculation (OOI) comprises a value between 0.505<OOI<0.575, wherein the osculations further satisfy the following expression: OOE>OOI; and
the contact angle (CAO) for the axially outer row of rolling bodies comprises a value between 10° and 50°; and
wherein, when the distance (RTO) is a negative value, the tribological parameters of the axially outer row of rolling bodies comprise the following:
the axially inner pitch diameter (DPI) comprises a value no less than 35 mm,
the number (NSI) of rolling bodies of the axially inner row of rolling bodies is (NSI)=nearest integer to π/arcsin ((DSI+0.1)/DPI)−8, the external diameter (DSI) of the rolling bodies of the axially inner row of rolling bodies comprises a value between 8 mm<DSI<21 mm,
the first osculation (OIE) comprises a value between 0.505<OIE<0.585, and the second osculation (OII) comprises a value between 0.505<OII<0.575, wherein the osculations further satisfy the following expression: OIE>OII; and
the contact angle (CAI) for the axially inner row of rolling bodies comprises a value between 10° and 50°.

2. The wheel hub assembly according to claim 1, in which the tribological parameters comprise the following values:
DPI=70.7 mm
NSI=14
DSI=14.288 mm
OIE=0.5375; OII=0.5179
CAI=33°
DPO=71.3 mm
NSO=17
DSO=12.7 mm
OOE=0.5362; OOI=0.5173
CAO=37°.

* * * * *